United States Patent [19]

DeBardeleben

[11] 4,437,430
[45] Mar. 20, 1984

[54] METHOD AND APPARATUS FOR TRAINING CATS TO USE A TOILET BOWL

[76] Inventor: Martha G. DeBardeleben, 219 Mercer St., Princeton, N.J. 08540

[21] Appl. No.: 371,559

[22] Filed: Apr. 26, 1982

[51] Int. Cl.³ ............................................. A01K 29/00
[52] U.S. Cl. .................................................. 119/1; 4/6; 119/29
[58] Field of Search ....................... 119/1, 29; 4/6, 1

[56] References Cited

U.S. PATENT DOCUMENTS

| | | | |
|---|---|---|---|
| 2,053,594 | 9/1936 | Albert | 119/1 |
| 2,407,005 | 9/1946 | Haley | 4/231 |
| 2,584,656 | 2/1952 | Anderson | 119/1 |
| 2,931,047 | 4/1960 | Stebbins | 4/1 |
| 3,476,083 | 11/1969 | Vander Wall | 119/1 |
| 3,484,872 | 12/1969 | Romberger, Jr. | 4/6 |
| 3,486,172 | 12/1969 | Gleichert | 4/1 |
| 3,688,742 | 9/1972 | McGee | 119/1 |
| 3,827,401 | 8/1974 | Franzl | 119/1 |
| 3,949,429 | 4/1976 | Hall | 4/10 |
| 3,965,863 | 6/1976 | Scott | 119/1 |
| 4,181,096 | 1/1980 | Grubman | 119/1 |

*Primary Examiner*—Jay N. Eskovitz
*Attorney, Agent, or Firm*—Richard C. Woodbridge

[57] ABSTRACT

A receptacle for holding cat litter material is secured in a toilet bowl in such a fashion that it can be easily used by cats. The apparatus includes a substantial flange for providing stability and a rim overlapping tab to secure the receptacle to the front of the toilet bowl. Holes are provided in the bottom of the receptacle to drain liquid. The size and location of the receptacle is such that it covers only approximately 1/6 of the total opening of the bowl. Therefore the apparatus can be used with cats at will and without assistance and does not have to be removed in order for the bowl to be used by humans. A cat can be trained to use the apparatus with progressively smaller amounts of litter material until the cat uses the apparatus without any litter material at all. At that point it may be possible to remove the apparatus so that the cat relieves itself directly into the toilet bowl.

1 Claim, 4 Drawing Figures

METHOD AND APPARATUS FOR TRAINING CATS TO USE A TOILET BOWL

BACKGROUND OF THE INVENTION

1. Field of the Invention

This invention relates to a method and apparatus for training cats to relieve themselves in a standard toilet bowl.

2. Brief Description of the Prior Art

There are a number of devices which can be employed to train animals to use a toilet bowl. The following possibly relevant U.S. Pat. Nos. describe training devices of interest: 2,053,594; 2,584,656; 3,672,331; 3,757,738 and 3,949,429. In addition, U.S. Pat. No. 4,181,096 is adaptable for both pets and babies. The foregoing references all have the advantage of being usable for both dogs and cats. However, they are disadvantageous in that they are large, expensive and cumbersome, and generally must be placed on and taken off the toilet each time they are used by the pet. U.S. Pat. No. 3,688,742 describes a "Toilet Training Assembly for Cats" which is specific for that animal only. The device is intended just for the purpose of training a cat to use a conventional commode. It cannot be left in place at all times so that the commode can simultaneously be used by human beings.

Structures are also known in the prior art that are adapted to fit inside toilet bowls for other purposes. For example, the following U.S. Pat. Nos. describe anti-noise and anti-splash structures of possible relevance and interest: 2,407,005; 2,931,047; 3,486,172; and, 3,614,790. U.S. Pat. No. 3,654,638 describes an "Output Commode Pan" which is employed to collect urine and other bodily fluids but does not appear to make provision for draining the collecting vessel. U.S. Pat. No. 3,484,872 describes a "Portable Bath Unit" which also fits in the toilet and makes no specific provisions for drainage. None of the foregoing devices appear to have the structural and mechanical advantages of the present invention.

There has been a long felt need for the method and apparatus of the present invention. The cat population of the United States is now estimated to be between 25 and 30 million cats. It is further estimated that the population will become larger as the trend toward apartment living continues, because it is harder to keep a dog in an apartment than it is to keep a cat. Cats do not need to be "walked" several times a day, or to be exercised outdoors. Cats are far easier to maintain because of their smaller sizer and because of their natural instinct to use sand or absorbent litter material when urinating or defecating. Even so, their litter pans are the source of unpleasant odors and of the disagreeable task of regularly emptying them, washing them, and refilling them with clean litter. Disposal of this material is also a health problem. Accordingly, a need became apparent for a device which could be used to help train a cat to relieve itself directly in a toilet rather than in a conventional litter box.

SUMMARY OF THE INVENTION

Briefly described, the invention comprises a receptacle that can be selectively attached to a toilet bowl. Holes are located in the bottom of the receptacle for draining liquid. Cat litter material is typically placed in the receptacle to encourage the cat to use the apparatus. A wide flange rim is attached to the top of the receptacle and fits flush against the forward edge of the toilet bowl. A wide downwardly depending tab overlaps the front of the toilet bowl and provides for substantial security to the apparatus. The device takes up approximately 1/6 of the open area of the toilet bowl so that the commode can be used by cats and humans without removing the receptacle. It is possible to train a cat to use the toilet bowl if progressively smaller amounts of cat litter are placed in the receptacle until such time as the cat uses the receptacle without the benefit of the cat litter in it. At that point the apparatus can be totally removed and the cat will relieve itself directly into the bowl without requiring the presence of the apparatus.

These and other features of the invention will be more fully understood by reference to the following drawings:

DETAILED DESCRIPTION OF THE INVENTION

During the course of this description like numbers will be used to identify like elements according to the different views which illustrate the apparatus.

Figure 1:
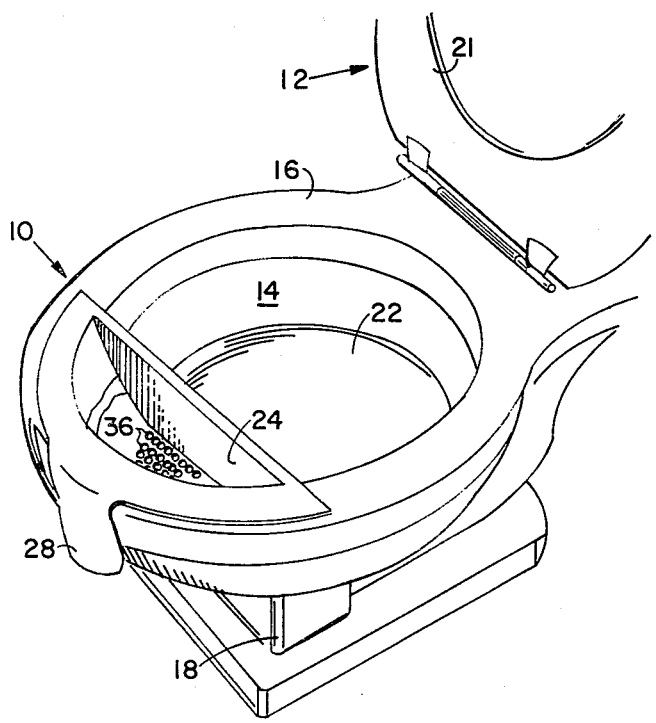
FIG. 1 is a perspective view of the invention 10 shown in position on a conventional toilet 12.

The invention 10 according to the preferred embodiment thereof is adapted to sit in and on a conventional commode 12 as illustrated in FIG. 1. The conventional commode 12 is understood to include a bowl 14 and a tank (not illustrated) which sits up and behind the bowl 14. Bowl 14 is supported by a base 18 and includes a top circumferential rim 16 which normally supports a toilet seat 21 when the toilet seat 21 is down. Water 22 from the tank (not illustrated) normally fills the hollow interior 20 of bowl 14.

Figure 2:
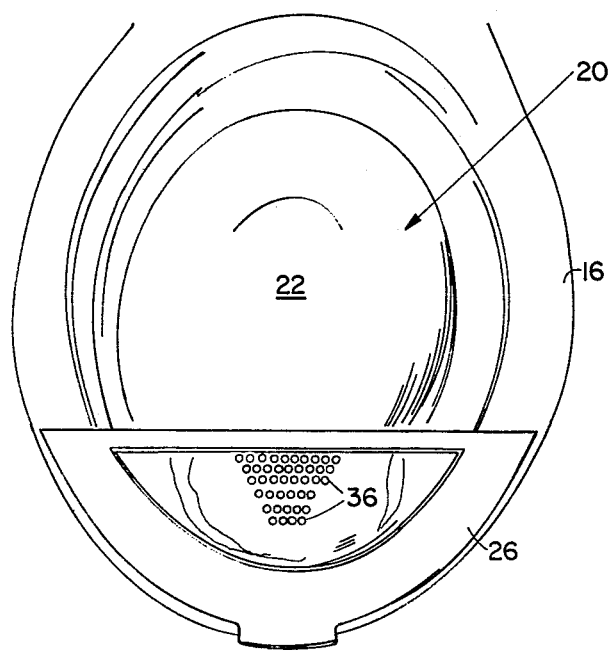
FIG. 2 is a top plan view of the invention 10 illustrated in position in FIG. 1.
Figure 3:
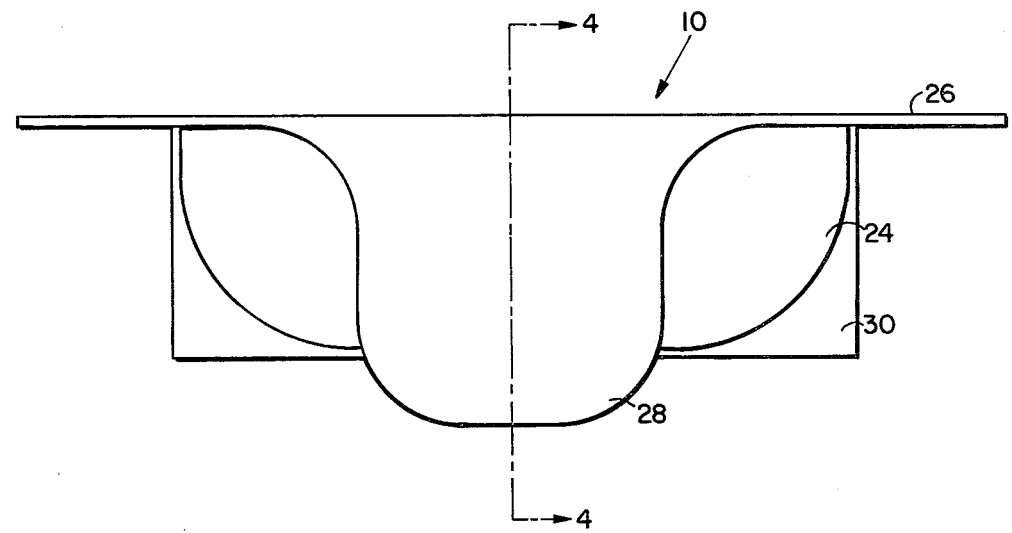
FIG. 3 is a front elevation view of the invention 10.
Figure 4:
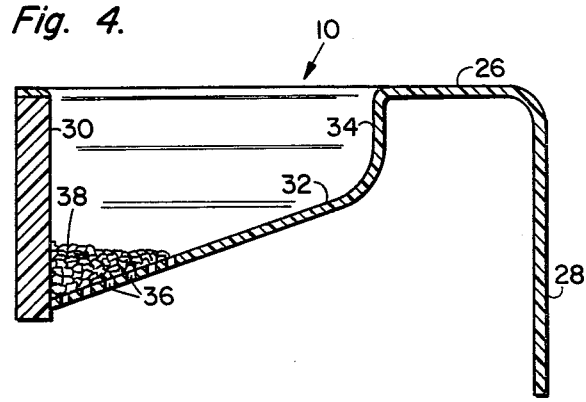
FIG. 4 is a side cross-sectional view of the invention 10 showing how it may be used with an appropriate cat litter material 38.

The invention 10 sits in bowl 14 in the manner illustrated in detail in FIGS. 1 and 2. Invention 10 basically comprises a receptacle section 24, a flat flange-like rim 26 attached to the upper portion of receptacle section 24 and a downwardly depending and overlapping front tab 28 also attached to flange 26. Receptacle section 24 includes a substantially vertical back wall 30, a sloping floor 32 attached at its lower end to the bottom of back wall 30 and attached at its upper end to a substantially vertical front wall 34 connected to the inside edge of flange 26. Drainage holes or apertures 36 are located in the sloping floor 32. Drainage holes or apertures 36 are located in the sloping floor 32 near the bottom edge thereof. The size of apertures 36 is important. The apertures 36 must be large enough to permit liquid, such as urine, to pass through. However, the holes 36 can't be so large as to permit the cat litter 38 to run out of the receptacle section 24. Litter material 38 may be any type of conventional material used for cat pans. Frequently, absorbent clay is used. More recently litter materials have been sold which include chlorophyl or perfumes to minimize undesirable odors. Materials such as sand could be used also. The invention 10 can be made of heavy plastic and molded in the shape of half of a shallow basin as illustrated in the figures. The flange 26 fits over the edge 16 of the bowl 14 and tends to stabilize the apparatus 10 against tipping. The wide overlapping frontal tab 28 is sufficiently broad to engage a substantial portion of the front exterior edge of bowl 14 thereby keeping the apparatus 10 from being pushed out of place. Extra thicknesses of material along the straight edges makes the invention 10 sturdy enough for the cat to feel safe when sitting upon the device. Holes 36 are normally positioned at the lowest point on sloping floor 32 so as to allow for the maximum drainage of cat urine through the receptacle section 24.

An important aspect of this invention is the location and relative size of the device 10 with respect to the open top of bowl 14. The invention 10 is preferably located up against the front edge of bowl 14. As seen from the top in FIG. 2 the invention 10 only takes up about 1/6 of the available opening area of bowl 14. This is important because it allows humans to use the toilet 12 without having to remove the invention 10. This saves a considerable amount of time and avoids additional messy handling of the device and its contents.

The invention 10 is preferably used according to the following method. The cat's old, conventional litter pan is placed in the bathroom for a couple of days so that the cat gets used to the idea of the bathroom as a place to relieve itself. Next, the invention 10 is set on the front edge of the toilet bowl 14 in the manner illustrated in FIGS. 1 and 2. About half a cup of fresh cat litter 38 is then placed into the receptacle 24 along with an equal amount of "used" kitty litter from the conventional litter pan. The cat is then shown the apparatus 10 by holding him near it while stroking him and reassuring him. The cat is allowed to stand on the apparatus 10 and sniff it the way that cats normally do. The cat's food and water dishes and bed are also left in the bathroom. It is desirable to close the cat inside the bathroom along with its food and water and bed for approximately 24 hours until the cat has learned to use the apparatus 10 several times. The cat's natural ability to jump along with its instincts to relieve itself where he can dig and where his nose tells him he has been before will eventually lead him to relieve himself in the apparatus 10. Generally no special "training" is necessary above and beyond that just described.

The litter 38 can be kept fresh indefinitely by flicking feces with a suitable small rake or other suitable object out of the receptacle 24 and by occassionally pouring a glass or two of fresh water through the receptacle 24 thereby flushing out undesirable remaining contaminants. As the cat becomes more and more familiar with the use of the invention 10, it will be possible to use progressively less and less cat litter.

Many cats like to dig and cover after they have relieved themselves. For those kind of cats it will be necessary to continue to place at least a small amount of cat litter 38 in the receptacle 24. However, some cats do not require cat litter 38 and it is possible by progressively removing cat litter 38 from the receptacle 24 to teach those particular animals to relieve themselves directly in the receptacle 24 without the benefit of cat litter 38. Eventually it may be possible to remove the apparatus 10 entirely so that the cat relieves itself directly into the toilet bowl 14 without any other assistance. At that point the invention 10 can be passed on to someone else who may have a similar problem.

There are a number of advantages to the present invention. It is possible to produce and sell the invention for a resonably small price due to its relatively small and compact size and that fact that specialized materials and specialized machining is not required. The device is especially useful for apartment dwellers because it eliminates the need for a regular litter pan. As a matter of fact, it effectively takes up no space at all since it is not necessary to move the apparatus 10 when the toilet 12 is being used by human beings. As a training device the apparatus 10 is especially advantageous because no special instructions are necessary in order to teach the cat's owner how to get the cat to use the device. When used according to the relatively uncomplicated directions described, almost all cats will use the device successfully, frequently after the first time they are exposed to it. It should be noted that the seat 21 of the commode 12 may be left either up or down. When the seat is left up, as shown in FIG. 1, the cat will use the invention 10 without even touching the seat. In other words, the apparatus is sufficiently stable that it is not necessary for the seat 21 to be in the down mode in order for the cat to use it. If the owner does not object to the cat's standing on the commode seat 21, it is to be expected that many cats will eventually learn to use the toilet 12 so that the invention 10 can be eliminated completely. This result cannot be guaranteed with all cats, but it has been proven possible with some cats and is otherwise a benefit for those that still need litter material 38 to coax them to use the device 10.

While the invention has been described with respect to the preferred embodiment 10 thereof, it will be appreciated by those of ordinary skill in the art that various modifications and changes may be made to the structure and elements that comprise the invention 10 without departing frm the spirit and scope thereof.

I claim:
1. A toilet apparatus for training cats to use a toilet bowl comprising:
   a unitary plastic receptacle means for holding cat litter material, including a substantially vertical back wall and a sloping floor;
   a substantially flat flange attached to said receptacle means, said sloping floor extending from the bottom of said back wall upwards towards said flange;
   aperture means in said receptacle means for draining said receptacle means, said aperture means being sufficiently large enough to drain said receptacle means of liquid, but small enough to prevent any substantial portion of said cat litter material from passing therethrough, said aperture means comprising holes in said sloping floor; and,
   attachment means for attaching said receptacle means to a standard commode so that said receptacle means sits substantially inside of said commode, said attachment means being attached to said substantially flat flange and including an overlapping tab means for engaging the front exterior portion of said commode bowl, said tab means comprising a single wide overlapping tab,
   wherein said receptacle means takes up no more than approximately one-sixth of the open area of the top of said bowl and is located towards the front of said bowl so that said commode may be used by human beings without necessitating removal of said apparatus.

* * * * *